Jan. 20, 1970
G. C. TOMA
3,490,300
MOLD ATTACHING CLIP
Filed June 10, 1968
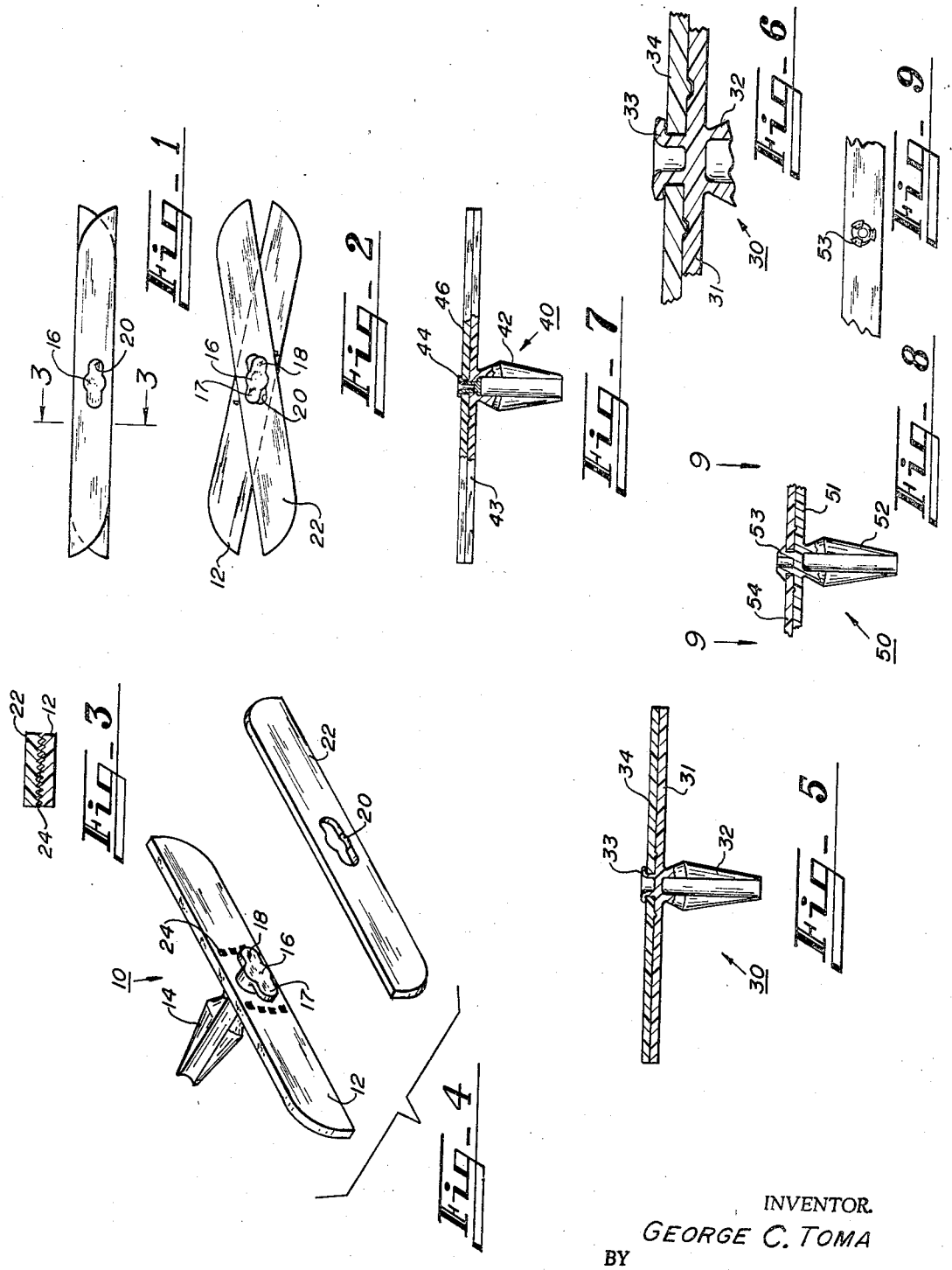
INVENTOR.
GEORGE C. TOMA
BY
Ralph R. Roberts
AGENT.

United States Patent Office 3,490,300
Patented Jan. 20, 1970

3,490,300
MOLD ATTACHING CLIP
George C. Toma, 27 Grace St., Clifton, N.J. 07011
Filed June 10, 1968, Ser. No. 735,759
Int. Cl. E04f 19/02; A44b 17/00
U.S. Cl. 24—73                                    10 Claims

ABSTRACT OF THE DISCLOSURE

A mold attaching clip in which one of a pair of like sized arms is rotatably mounted at its center and is retained in continuous relationship to a fixed arm so that complimentary serrated facing portions formed on the arms are maintained in frictional engagement with each other. The movable arm is rotatable to a desired position by means of the serrated facing portions retained in this position during and after insertion of the clip into a molding. The fixed arm portion of the clip is further provided with a hollow tapered plug having wall portions disposed to spring inwardly as the plug is pushed into a hole formed in a sheet metal body and, after insertion into this hole, the wall portions spring outwardly to retain the clip in the hole. The clip is preferably molded of plastic such as nylon, polyethylene and the like.

BACKGROUND OF THE INVENTION

Field of the invention

This invention pertains to the general class of buckles, buttons, clasps, etc., and more particularly to the subclass of "separable fasteners" and more particularly to the subclass of "runway engaging, head and socket" and more particularly to "axial closures" with "pivoted head" and "resilient head."

Description of the prior art

Mold attaching clips are, of course, well known and in particular are extensively used to attach decorative mold strips to the skin surface of automobile bodies. These strips are particularly used as longitudinal stripes or accentuating members. The mold attaching clips used as original equipment in many cases are attached by bolts and the like at the time of the body fabrication at the factory. When the body of the car is damaged or vandalized and repair is required, it is often difficult and time consuming to replace these clips and secure the clip to an existing or newly formed hole in the body. It is an object of this invention, therefore, to provide a mold attaching slip which has its mounting stem or stud member resiliently formed so that it may be readily attached from the outside of the body by forcing the stem into an aperture in the body after which the stem is allowed to expand into a retaining position. In addition, it is intended that the adjusting and retaining of the arms is absent the use of springs and the like. The clip is preferably made of plastic and has a wide range of adjustment so that it may be nearly universally used to retain said moldings to bodies that have been repaired after accidental damage or after vandalism or other loss. The difficulty in bolting clip to car bodies arises in that interior linings, panels and the like are attached to the inside of the car at assembly and for original equipment must be removed. It is also often inconvenient or nearly impossible to secure the original equipment mold retaining clip, hence, the convenience and necessity for a universal repair clip.

SUMMARY OF THE INVENTION

The mold attaching clip of this invention includes two arms, one of which is pivotally attached to its center and is disposed to be rotatable from a minimum to a maximum condition. The movable arm is retained in its adjusted position by means of a serrated face portion urged into engagement with a like or compatible serrated portion disposed on the fixed arm. After the movable arm is rotated to position, the frictional engagement of tooth or serrated portions of the arms retain the rotated arm in its adjusted condition. The stud mounting member of this retaining clip is integrally molded onto the fixed arm and has a hollow tapered configuration with a small portion removed therefrom to provide a spring tapered plug disposed to be driven into and retained in an aperture or drilled hole formed in a sheet metal automobile body.

INTENT OF THE DISCLOSURE

There has been chosen a specific embodiment of a mold attaching clip for attaching decorative trim and like moldings to automobile bodies and showing a preferred means of construction of the clip. This specific embodiment and alternate embodiments thereof have been chosen for the purposes of illustration and description as shown in the accompanying drawing wherein:

Brief description of the drawings

FIG. 1 represents a plane view looking at a preferred mold attaching clip in its closed or folded condition;

FIG. 2 represents the clip of FIG. 1 with the movable arm rotated to a partially open or mold engaging condition;

FIG. 3 represents a sectional view taken on the line 3—3 of FIG. 1 and showing in particular the serrated portions formed in the faces of the arms of the clip;

FIG. 4 represents an exploded isometric view of the members of the embodiment of FIG. 1;

FIG. 5 represents a sectional view showing an alternate method of construction and assembly of the mold attaching clip;

FIG. 6 represents an enlarged view of the assembly of the clip of FIG. 5;

FIG. 7 represents a sectional view of yet another clip with an alternate method of construction and assembly;

FIG. 8 represents a sectional view of yet another method of construction and assembly of a rotatable arm to the main member of the clip, and FIG. 9 represents a plane view taken on the line 9—9 of the clip of FIG. 8.

In the following description and in the claims various details will be identified by specific names for convenience, said names, however, are intended to be generic in their application. Corresponding reference characters refer to like members throughout the several figures of the drawing.

The drawing accompanying, and forming part of, this specification discloses certain details of construction for the purpose of explanation of the broader aspects of the invention, but it should be understood that structural details may be modified in various respects and that the invention may be incorporated in other structural forms than shown.

Description of the preferred embodiment of FIGS. 1 through 4

Referring now in particular to the mold retaining clip shown in FIGS. 1 through 4, there is shown a body 10 having a fixed arm member 12 to which a stem portion 14 is integrally formed or attached. In this embodiment the stem is tapered from a shoulder portion adjacent the fixed arm. The stem is generally hollow or tubular and has a side portion cut away to permit the tapered portion of the stem to act as a spring so as to be moved inwardly to enter and at its reduced shoulder portion to be retained in a determined size hole. The upper portion of the body 10 includes a pivot post 16 which is formed with extending ear portions 17 and 18 of determined size. These portions, as shown, are rounded wing portions of determined thickness and are positioned to provide a space between the undersurface of the wings 17 and 18 and the flat upwardly facing portion of the arm 12.

A contoured aperture 20 is formed in a movable arm 22, the aperture sized and contoured so as to pass over the pivot post 16. After passing the wings 17 and 18 the arm 22 is rotated, whereupon the wing portions 17 and 18 engage the upper or outer surface of the movable arm 22. Serrations 24 are formed as a pair of arcuate bands in the upper surface of the arm portion 12 and a like pair of like formed or compatible serrations are formed in the undersurface of the arm 22. As particularly seen in FIG. 3, the serrated portions of the arm may have the apex of the serrations about one-thirty-second of an inch apart and with the apex about twenty to thirdy thousandths of an inch in height. As the movable arm 22 is rotated, these serrations are ratchetted until the arm is moved to its desired position whereat the arm members 12 and 22 are retained by the serrations in their adjusted position. It is to be noted in FIG. 1 that the aperture 20 and the stem 16 coincide when the arm members 12 and 22 are aligned for assembly and disassembly if desired. Whereas, as seen in FIG. 2, when arm 22 is rotated, the wing portions 17 and 18 are brought into retaining engagement of the upper surface of arm 22 to retain this arm on the stem 16.

The molding retaining clip of FIGS. 1, 2, 3 and 4 is contemplated as being assembled by the user at the time of installation into the molding. The arms, as shown, are made of a maximum length to accommodate wide moldings and, when desired, the ends of the arms are cut so as to provide the length of the arm desired. In many clips it may be desirable to have the retaining clip and arms of a narrower width. This is a matter of design wherein the arms 12 and 22 are narrowed, but this requires that the stem 16 and aperture 20 be then reduced by a proportionate amount. The amount of material for retaining the arm members 12 and 22 together is reduced and allows the arms to readily deflect. This deflection is an undesirable factor, hence certain alternate assembly means is provided.

Mold attaching clip of FIGS. 5 and 6

Referring next to FIG. 5, there is shown an attaching clip wherein a tapered stem member 30 has a lower arm 31 molded integral with a stem portion 32. Extending above the arm 31 is an integral portion in the form of a tubular member 33 which has a shoulder portion sized to rotatably retain the upper arm 34. At the time of assembly, the outer portion of the tubular member 33 is heat softened and is formed as a rivet retaining means. Heat is applied to the outer portion of this member to permit the portion to be curled over to form a plastic rivet. In FIG. 6 the enlarged view shows the rivet in greater detail and in the formed condition.

Mold attaching clip of FIG. 7

Referring next to FIG. 7, there is shown an alternate construction of a rivet retaining means. In this configuration, the lower body member 40 is made with a stem portion 42 having an aperture through its upper end. The stem portion 42 is made integral with the lower arm member 43. A tubular rivet or eyelet 44 of metal or plastic is caused to pass through an aperture in the upper arm 46 and both ends of the eyelet or rivet 44 are turned over to retain the arm members in a contiguous relationship.

Mold attaching clip of FIGS. 8 and 9

Referring finally to the clip of FIGS. 8 and 9, it is to be noted that a lower portion 50 includes a lower arm 51 molded integral with a stem portion 52. Extending above arm 51 is an upper retaining rivet portion 53 made with a shoulder. This entire rivet portion is formed in three finger segments with spaces therebetween. The upper or outer portion of the rivet portion is conically shaped to provide a cam slope for the passage thereover of an aperture formed in an upper arm 54. As seen in FIG. 9, after the arm 54 has been brought into contiguous relationship with the lower arm 51, the finger segments of the rivet portion 53 spring outwardly to provide a shoulder whereby to retain the upper arm in its desired relationship.

Referring particularly to FIG. 4, it is to be noted that the arcuate path of the serrated portion 24 may be of a narrow or wide width, the path disposed in a radius a determined distance from the theoretical axis of the body portion 30. In each of the above-described embodiments, it is contemplated that the retaining of the upper movable arm in a determined rotated relationship to the lower arm is by means of the serrated portions 24. The serrations are ratchetted as the upper arm is moved and the serrations engage each other so that with the upper arm moved into position, it is retained in this position.

Use and operation

In the use of the above-described mold attaching clips to retain a trim molding on an automobile, it is contemplated that a hole of determined size is present or formed in the sheet metal of the body. This hole is disposed so that on the underside of the sheet metal there is provided sufficient room so that the various stem portions may enter the hole in the sheet metal and then expand to reside on the underside of the body sheet metal. Prior to the attachment of the plastic retaining clip to the sheet metal, the clip of FIGS. 1 through 4 is assembled by bringing the upper arm 22 into engagement with the lower arm 12 and rotating the arm 22 to the position of FIG. 2. The outer ends of the arms are moved into a position whereby the arcuate ends of the clip are disposed to enter the inwardly extending flange portions of the molding or trim strip (not shown). The thickness of the arms is made to accommodate the space generally available between the molding flange and its wall. The trim strip is retained on the clip by rotating the arms of the clip to the engaging condition whereupon the serrated portions of the clip in frictional engagement retain the arms in the adjusted position. The trim strip is mounted and maintained on the four arcuate ends of the arms of the clip. A plurality of these clips are normally used to retain the trim molding to the sheet metal of the automobile, the clips being spaced along the strip so that the stems may enter appropriately positioned apertures of determined size and spacing in the body. After the clips have been mounted within the trim molding, the stems are brought in way of the various apertures and are entered therein. The trim is then pushed in place with the upper tapered portion of the stem entering and seating itself in the hole in the sheet metal to retain the clip and the attached trim molding in place.

It is, of course, realized that the above clip is contemplated as being molded of plastic such as polyethylene, polypropylene and others. This molded clip is intended to be low in cost and also the plastic clip is not susceptible to rusting. It is also contemplated that the plastic selected is sufficiently resilient to act as a spring in the stem portion which is contemplated as being able to be sprung inwardly as the tapered portion passes through a hole of determined size. The plastic is also selected so that the arms are sufficiently rigid to retain the trim, yet sufficiently resilient so that the serrated portions of the arm may flex sufficiently to allow the serrated teeth to pass each other, yet still providing a sufficient amount of rigidity to cause the arms, once they have been moved into position, to be retained in the adjusted position.

Terms such as "upper," "lower," "bottom," "top," "in," "out" and the like are applicable to the embodiments shown and described in conjunction with the drawing. These terms are merely for the purposes of description and do not necessarily apply to the position in which the mold attaching clip may be constructed or used.

The conception of the mold attaching clip and its many applications is not limited to the specific embodiments shown but departures therefrom may be made without sacrificing its chief advantages and protection is sought to the broadest extent the prior art allows.

What is claimed is:

1. A mold attaching clip disposed to engage and retain a trim molding strip such as is used on automobile bodies and the like, the clip selectively adjustable to engage and retain any of a variety of sizes and shapes of trim, the clip including: (a) a fixed arm member of selected width, length and thickness; (b) a stem portion for attaching the clip to the body, the stem fixedly attached to and extending at substantially right angles to and from one side of the midportion of the fixed arm, the stem portion having a tapered portion extending from a maximum shoulder diameter formed intermediate the stem, the taper diminishing from the maximum shoulder diameter to the free end, and a reduced shoulder portion formed in the stem and disposed adjacent the fixed arm; (c) a movable arm of selected width, length and thickness, the movable arm having an aperture of determined contour formed intermediate its ends; (d) means for rotatably retaining the movable arm in a sliding engagement with the fixed arm; and (e) serrated surface portions formed on selected surfaces of each of the arms, and with the arms in an assembled condition, the serrated surfaces are disposed to mate with and engage each other to provide a ratcheting means for frictionally retaining the arms in a selected position to which they may be moved.

2. A mold attaching clip as in claim 1 in which the members forming the clip are of molded plastic and in which the movable arm is substantially the same width and length as the fixed arm.

3. A mold attaching clip as in claim 2 in which the means for rotatably retaining the movable arm includes a pivot post attached to and formed so as to extend beyond the fixed arm, the pivot post having oppositely disposed extending ear portions of determined contour and providing spaced undersurface shoulder portions thereon, and in which the aperture in the movable arm is contoured to pass over the pivot post and extending ear portions when the arms are brought into a selected orientation and when moved from this orientation the ear portions are disposed to engage the upper surface of the movable arm and retain the movable arm on the pivot post.

4. A mold attaching clip as in claim 3 in which the extending ear portions are of rounded contour and the contoured aperture is precisely shaped to just pass the stem and extending ear portions.

5. A mold retaining clip as in claim 4 in which the ear portions lie in a plane aligned with the axis of the fixed arm and in which the contoured aperture in the movable arm has its ear passing portions arranged in a plane aligned with the axis of the arm.

6. A mold attaching clip as in claim 2 in which the means for rotatably retaining the movable arm includes a cylindrical member formed integral with and extending from the fixed arm, and in which the aperture in the movable arm is sized to slidably rotate on the cylindrical member and in which at least the outer portion of the cylindrical member is of a tubular configuration and is curled over to provide a plastic rivet head.

7. A mold attaching clip as in claim 2 in which the means for rotatably retaining the movable arm includes an upwardly extending tubular portion having a conically shaped outer head portion and providing thereon an undershoulder, said upwardly extending tubular portion formed into separate finger segments, and in which the aperture in the upper arm is sized to engage the taper of the head portions to cam them inwardly as the upper arm is caused to pass over them until the movable arm is moved by the head portions, whereupon the finger segments are allowed to spring outwardly with the undershoulders of the head providing a retaining shoulder for the movable arm.

8. A mold retaining clip as in claim 1 in which an aperture is formed in the fixed arm and is axially aligned with the stem portion, and in which the aperture in the movable arm is of a like size, and with the apertures in the arms aligned, a tubular rivet is caused to engage both apertures and the ends of the tubular rivet are turned to provide shoulders retaining the arms in a contiguous relationship.

9. A mold retaining clip as in claim 1 in which the stem is of generally hollow configuration and has a side portion cut away to permit the tapered portion of the stem to be deflected inwardly as a spring as it is entered into a hole formed in the sheet metal of an automobile, and after the tapered stem passes through the hole is permitted to spring outwardly to retain the stem in the sheet metal.

10. A mold retaining clip as in claim 1 in which the serrated portions lie in like arcuate paths and in which the serrations are formed with apexes about one-thirty-second of an inch apart and with the serrations about twenty-to-thirty thousandths of an inch in height.

References Cited

UNITED STATES PATENTS

| | | | |
|---|---|---|---|
| 2,725,609 | 12/1955 | Ross. | |
| 2,979,795 | 4/1961 | West | 52—718 XR |
| 2,984,877 | 5/1961 | Perrochat | 24—213 XR |
| 3,110,069 | 11/1963 | Jones. | |
| 3,123,389 | 3/1964 | Biesecker | 85—5 XR |

FOREIGN PATENTS

| | | |
|---|---|---|
| 435,988 | 5/1948 | Italy. |

DONALD A. GRIFFIN, Primary Examiner

U.S. Cl. X.R.

85—5